United States Patent
Choi

(10) Patent No.: US 11,815,906 B2
(45) Date of Patent: *Nov. 14, 2023

(54) AUTONOMOUS VEHICLE OBJECT DETECTION METHOD AND APPARATUS

(71) Applicant: Samsung Electronics Co., Ltd., Suwon-si (KR)

(72) Inventor: Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

This patent is subject to a terminal disclaimer.

(21) Appl. No.: 17/391,110

(22) Filed: Aug. 2, 2021

(65) Prior Publication Data

US 2021/0356971 A1 Nov. 18, 2021

Related U.S. Application Data

(63) Continuation of application No. 15/941,436, filed on Mar. 30, 2018, now Pat. No. 11,079,769.

(30) Foreign Application Priority Data

Nov. 23, 2017 (KR) .......................... 10-2017-0157298

(51) Int. Cl.
*G05D 1/02* (2020.01)
*G01S 13/93* (2020.01)
(Continued)

(52) U.S. Cl.
CPC ............ *G05D 1/0257* (2013.01); *G01S 7/411* (2013.01); *G01S 7/414* (2013.01); *G01S 13/42* (2013.01);
(Continued)

(58) Field of Classification Search
CPC ............... G05D 1/0257; G05D 1/0212; G05D 2201/0213; G01S 7/411; G01S 7/414; G01S 13/42; G01S 13/931
See application file for complete search history.

(56) References Cited

U.S. PATENT DOCUMENTS

2004/0252047 A1 12/2004 Miyake et al.
2009/0015460 A1* 1/2009 Fox ........................ G01S 13/867
342/53

(Continued)

FOREIGN PATENT DOCUMENTS

JP 8-166452 A 6/1996
JP 2010-96584 A 4/2010
(Continued)

OTHER PUBLICATIONS

Korean Office Action dated Mar. 30, 2022, in counterpart Korean Patent Application No. 10-2017-0157298 (4 pages in English and 6 pages in Korean).

*Primary Examiner* — Peter D Nolan
*Assistant Examiner* — Demetra R Smith-Stewart
(74) *Attorney, Agent, or Firm* — NSIP Law

(57) ABSTRACT

An object detection method and apparatus for a vehicle in a confined space are provided. An object detection method for a vehicle traveling in a confined space, includes determining a first beam pattern and a second beam pattern based on geometric information of the confined space, detecting first candidate objects based on a first transmission signal emitted to form the first beam pattern using at least one antenna, detecting second candidate objects based on a second transmission signal emitted to form the second beam pattern using the at least one antenna, detecting at least one clutter object based on the first candidate objects and the second candidate objects, and detecting a target object based on the at least one clutter object.

20 Claims, 13 Drawing Sheets

(51) Int. Cl.
 *G01S 7/41* (2006.01)
 *G01S 13/931* (2020.01)
 *G01S 13/42* (2006.01)

(52) U.S. Cl.
 CPC .......... *G01S 13/931* (2013.01); *G05D 1/0212* (2013.01); *G05D 2201/0213* (2013.01)

(56) References Cited

U.S. PATENT DOCUMENTS

| | | | |
|---|---|---|---|
| 2009/0135051 | A1 | 5/2009 | Bishop et al. |
| 2009/0322591 | A1 | 12/2009 | Matsuoka |
| 2010/0026555 | A1 | 2/2010 | Whittaker et al. |
| 2010/0265122 | A1* | 10/2010 | Oswald .................. G01S 13/42 |
| | | | 342/136 |
| 2011/0199254 | A1 | 8/2011 | Bishop et al. |
| 2012/0206293 | A1* | 8/2012 | Nguyen .............. G01S 13/9089 |
| | | | 342/179 |
| 2012/0286136 | A1 | 11/2012 | Krill et al. |
| 2016/0357188 | A1 | 12/2016 | Ansari |
| 2017/0115387 | A1 | 4/2017 | Luders et al. |
| 2017/0184702 | A1 | 6/2017 | Lee et al. |
| 2017/0307732 | A1 | 10/2017 | Haghighi et al. |
| 2018/0232947 | A1 | 8/2018 | Nehmadi et al. |
| 2019/0128998 | A1 | 5/2019 | Josefsberg et al. |
| 2019/0204423 | A1 | 7/2019 | O'Keeffe |

FOREIGN PATENT DOCUMENTS

| | | |
|---|---|---|
| JP | 2015-28696 A | 2/2015 |
| KR | 10-1339108 B1 | 12/2013 |
| KR | 10-2016-0072574 A | 6/2016 |
| KR | 10-1702371 B1 | 2/2017 |

* cited by examiner

AUTONOMOUS VEHICLE OBJECT DETECTION METHOD AND APPARATUS

CROSS-REFERENCE TO RELATED APPLICATIONS

This application is a continuation of U.S. patent application Ser. No. 15/941,436 filed on Mar. 30, 2018, which claims the benefit under 35 USC § 119(a) of Korean Patent Application No. 10-2017-0157298, filed on Nov. 23, 2017, in the Korean Intellectual Property Office, the entire disclosure of which is incorporated herein by reference for all purposes.

BACKGROUND

1. Field

The following description relates to an object detection method and apparatus for an autonomous vehicle, and more particularly, to an object detection method and apparatus for an autonomous vehicle that travels in a confined space.

2. Description of Related Art

An autonomous vehicle emits a signal from within or outside the autonomous vehicle, receives the reflected emitted signal, and analyzes the received signal to detect a range, angle, and/or velocity of objects within the vicinity of the autonomous vehicle. The distance between the object and the autonomous vehicle is calculated based on the amount of time it took for the emitted signal to return, and an angle of the object relative to the vehicle being calculated based on the angle and intensity at which the reflected signal is received.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an object detection method for a vehicle traveling in a confined space, includes, determining a first beam pattern and a second beam pattern based on geometric information of the confined space, detecting first candidate objects based on a first transmission signal emitted to form the first beam pattern using at least one antenna, detecting second candidate objects based on a second transmission signal emitted to form the second beam pattern using the at least one antenna, detecting at least one clutter object based on the first candidate objects and the second candidate objects, and detecting a target object based on the at least one clutter object.

The detecting of the first candidate objects may include: emitting the first transmission signal to form the first beam pattern using the at least one antenna; receiving a first receive signal corresponding to the first transmission signal; detecting objects for the first receive signal based on the first receive signal; and classifying the objects for the first receive signal into a plurality of preset regions of interest (ROIs) based on a distance from the vehicle, the plurality of ROI comprising a target region, and the first candidate objects being included in the target region.

The detecting of the second candidate objects may include: emitting the second transmission signal to form the second beam pattern using the at least one antenna; receiving a second receive signal corresponding to the second transmission signal; detecting objects for the second receive signal based on the second receive signal; and classifying the objects for the second receive signal into the plurality of ROIs based on the distance from the vehicle, and the target region comprising the second candidate objects.

The detecting of the at least one clutter object may include detecting the at least one clutter object based on a radar cross-section (RCS) of each of the first candidate objects and an RCS of each of the second candidate objects.

The detecting of the target object may include, in response to two clutter objects being detected, detecting an object located between the two clutter objects as the target object.

The determining of the first beam pattern and the second beam pattern may include: setting a plurality of ROIs in the confined space based on the geometric information and a location of the vehicle; and determining the first beam pattern and the second beam pattern that cover the plurality of ROIs.

The object detection method may further include: acquiring the geometric information based on a location of the vehicle.

The object detection method may further include: generating a driving route for the vehicle within the confined space based on the at least one clutter object and the target object; and controlling the vehicle based on the driving route.

A non-transitory computer-readable storage medium storing instructions that, when executed by a processor, may cause the processor to perform the object detection method.

In another general aspect, an object detection apparatus included in a vehicle traveling in a confined space, includes a processor configured to determine a first beam pattern and a second beam pattern based on geometric information about the confined space, detect first candidate objects based on a first transmission signal emitted to form the first beam pattern using at least one antenna, detect second candidate objects based on a second transmission signal emitted to form the second beam pattern using the at least one antenna, detect at least one clutter object based on the first candidate objects and the second candidate objects, and detect a target object based on the at least one clutter object.

The object detection apparatus may further include a memory configured to store instructions, wherein the processor is further configured to execute the instructions to configure the processor to determine the first beam pattern and the second beam pattern based on geometric information about the confined space, detect the first candidate objects based on the first transmission signal emitted to form the first beam pattern using the at least one antenna, detect the second candidate objects based on the second transmission signal emitted to form the second beam pattern using the at least one antenna, detect the at least one clutter object based on the first candidate objects and the second candidate objects, and detect the target object based on the at least one clutter object.

To perform the detecting of the first candidate objects, the processor may be configured to: emit the first transmission signal to form the first beam pattern using the at least one antenna; receive a first receive signal corresponding to the first transmission signal; detect objects for the first receive signal based on the first receive signal; and classify the objects for the first receive signal into a plurality of preset regions of interest (ROIs) based on a distance from the vehicle, the plurality of ROIs comprising a target region, and the first candidate objects being included in the target region.

To perform the detecting of the second candidate objects, the processor may be configured to: emit the second transmission signal to form the second beam pattern using the at least one antenna; receive a second receive signal corresponding to the second transmission signal; detect objects for the second receive signal based on the second receive signal; and classify the objects for the second receive signal into the plurality of ROIs based on the distance from the vehicle, and the target region comprising the second candidate objects.

To perform the detecting of the at least one clutter object, the processor may be configured to detect the at least one clutter object based on a radar cross-section (RCS) of each of the first candidate objects and an RCS of each of the second candidate objects.

To perform the detecting of the target object, the processor may be configured to, in response to two clutter objects being detected, detect an object located between the two clutter objects as the target object.

To perform the determining of the first beam pattern and the second beam pattern, the processor may be configured to: set a plurality of ROIs in the confined space based on the geometric information and a location of the vehicle; and determine the first beam pattern and the second beam pattern that cover the plurality of ROIs.

The program may be further executed to acquire the geometric information based on a location of the vehicle.

The program may be further executed to: generate a driving route for the vehicle within the confined space based on the at least one clutter object and the target object; and control the vehicle based on the driving route.

The confined space may include at least one of a tunnel and a road with a barricade.

In another general aspect, an object detection method for a vehicle traveling in a confined space, method includes: acquiring geometric information of the confined space; setting a plurality of regions of interest (ROIs) in the confined space based on the geometric information and a location of the vehicle; determining a field of view (FoV) for each of the plurality of ROIs; emitting a transmission signal based on the determined FoV; and detecting an object based on a receive signal corresponding to the transmission signal.

In another general aspect, a processor implemented object detection method for a vehicle traveling in a confined space, includes: determining a plurality of regions of interest (ROIs) based on geometric information of the confined space; determining beam patterns based on the plurality of ROIs; detecting corresponding candidate objects based on transmission signals emitted to form the beam patterns using at least one antenna; detecting clutter objects based on currently detected candidate objects and subsequently detected candidate objects; and detecting a target object based on the clutter objects.

The determining of the plurality of ROIs may be further based a current direction and location of the vehicle.

The clutter objects may be detected based on a radar cross-section (RCS) of the candidate objects.

The method may further include: generating a driving route for the vehicle within the confined space based on the clutter objects and the target object; and controlling the vehicle based on the driving route.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

As used herein, the term "and/or" includes any one and any combination of any two or more of the associated listed items.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not intended to be limiting of the present inventive concept. As used herein, the singular forms "a," "an" and "the" are intended to include the plural forms as well, unless the context clearly indicates otherwise. It will be further understood that the terms "include" and/or "have," when used in this specification, specify the presence of stated features, integers, operations, elements, components or combinations thereof, but do not preclude the presence or addition of one or more other features, integers, operations, elements, components, and/or groups thereof.

Unless otherwise defined, all terms including technical and scientific terms used herein have the same meaning as commonly understood by one of ordinary skill in the art and after an understanding of the disclosure to which these examples belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description of examples, detailed description of well-known related structures or functions will be omitted when it is deemed that such description could cause ambiguous interpretation of the present disclosure.

Figure 1:
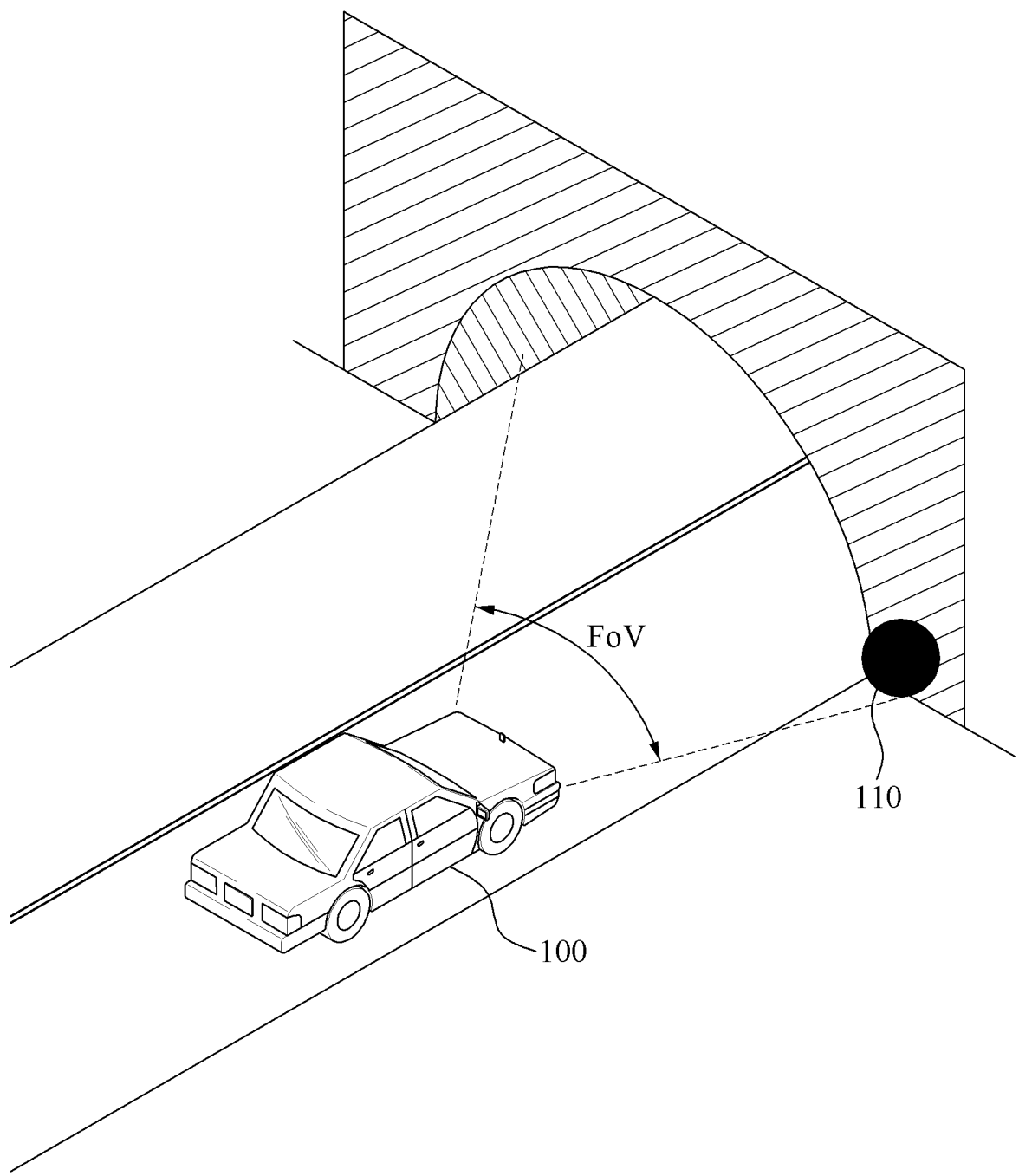
FIG. 1 illustrates an example of a vehicle traveling in a tunnel.

FIG. 1 illustrates an example of a vehicle 100 that travels in a tunnel.

The vehicle 100 emits a signal from within or outside the vehicle 100, receives the reflected emitted signal, and analyzes the received signal to detect objects within the vicinity of the vehicle 100. The vehicle 100 is, for example, an autonomous vehicle. The vehicle 100 includes one or more antennas, transmitters and/or receivers. The plurality of transmitters may be located at different orientation angles to transmit signals. The plurality of receivers may be located at different orientation angles to receive reflected signals.

When the vehicle 100 passes through a confined space, for example, a tunnel, the wall 110 of the tunnel is detected as an object or obstruction based on a reflected signal. When the wall 110 is detected as an object or obstruction, the wall 110 boundary is used to generate or set the driving route of the vehicle 100.

The wall 110 or object reflects the signal emitted from the vehicle 100. The direction and location of an object detected based on a signal reflected by the wall 110 is different from the direction and location of the real object reflecting the signal. In an example, an object may be located inside a tunnel but the location of the object calculated based on the signal reflected by the wall 110 may be incorrectly determined to be outside the tunnel. In this example, the object determined to be in a wrong location is referred to as a "ghost object." Due to ghost objects, the location of real objects may be ambiguous or not detected.

When a field of view (FoV) for a signal emitted from the vehicle 100 is wider than a width of the tunnel, a ghost object may be created and detected in the signal reflected by the wall 110. Thus, when it is determined that the vehicle 100 is traveling in a confined space, the vehicle 100 may detect a real object in the confined space by adjusting the FoV for the emitted signal.

Figure 2:
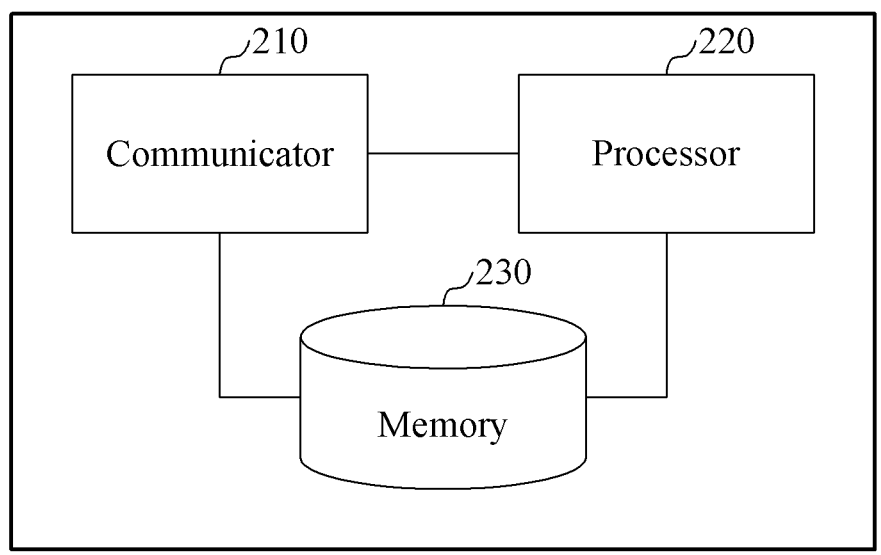
FIG. 2 illustrates an example of a configuration of an object detection apparatus.

FIG. 2 illustrates an example of a configuration of an object detection apparatus 200.

Referring to FIG. 2, the object detection apparatus 200 includes a communicator 210, a processor 220, and a memory 230, for example. The object detection apparatus 200 may be included in the vehicle 100 of FIG. 1.

The communicator 210 is connected to the processor 220 and the memory 230, and is configured to transmit and receive data to and from the processor 220 and the memory 230. The communicator 210 may be connected to an external device, and configured to transmit and receive data to and from the external device. In the following description, the expression "transmitting and receiving 'A'" refers to the transmitting and the receiving of data or information representing "A".

The communicator 210 is implemented, for example, as a circuitry in the object detection apparatus 200. In an example, the communicator 210 may include an internal bus and an external bus. In another example, the communicator 210 may be a device configured to connect the object detection apparatus 200 to an external device, for example, an interface device. The communicator 210 receives data from the external device and transmits data to the processor 220 and the memory 230.

The processor 220 is configured to process data received by the communicator 210 and data stored in the memory 230. The term "processor," as used herein, may be a hardware-implemented data processing device having a circuit that is physically structured to execute desired operations discussed hereinafter. In another example, the hardware implemented data processing device may be configured to implement one or more desired operations through the execution of code or instructions included in a program, e.g., stored in memory of the object detection apparatus 200. The hardware-implemented data processing device may include, but is not limited to, for example, a microprocessor, a central processing unit (CPU), a processor core, a multi-core processor, a multiprocessor, an application-specific integrated circuit (ASIC), and a field-programmable gate array (FPGA).

Thus, in one or more examples, the processor 220 executes a computer-readable code (for example, software) stored in a memory (for example, the memory 230), and executes instructions caused by the processor 220.

The memory 230 is configured to store data received by the communicator 210 and data processed by the processor 220. As noted above, in an example, the memory 230 stores a program. The stored program is coded to detect an object and is a set of syntax executable by the processor 220.

The memory 230 includes, for example, any one or any combination of any two or more of a volatile memory, a nonvolatile memory, a random access memory (RAM), a flash memory, a hard disk drive and an optical disc drive.

The memory 230 stores an instruction set (for example, software) to operate the object detection apparatus 200. The instruction set to operate the object detection apparatus 200 is executed by the processor 220.

The communicator 210, the processor 220 and the memory 230 will be further described below with reference to FIGS. 3 through 12.

Figure 3:
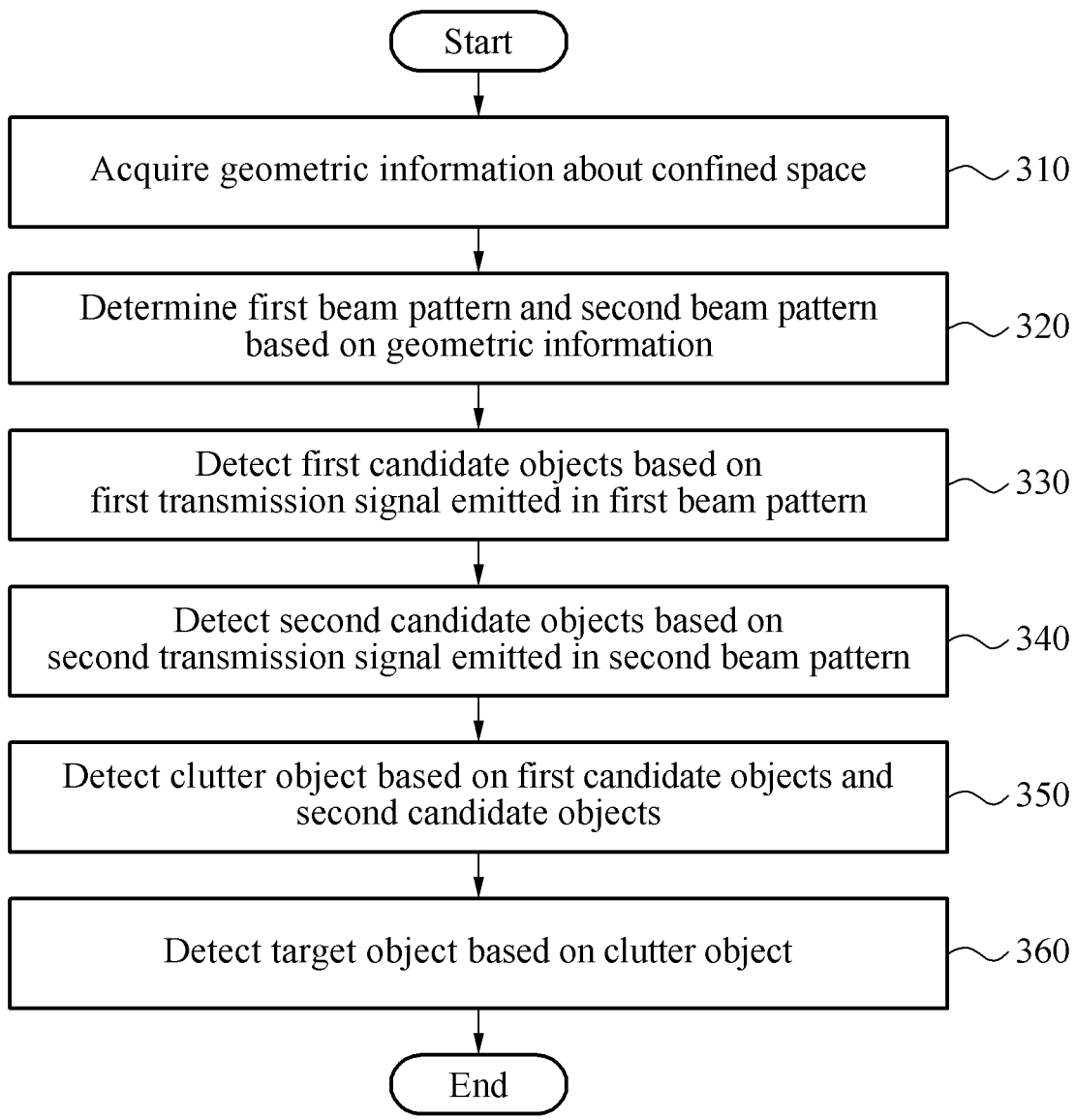
FIG. 3 is a flowchart illustrating an example of an object detection method.

FIG. 3 is a flowchart illustrating an example of an object detection method.

Operations 310 through 360 of FIG. 3 are performed by, for example, the object detection apparatus 200 of FIG. 2, noting that the examples are not limited thereto.

In operation 310, the processor 220 acquires geometric information about a confined space. For example, the location of the vehicle 100 is determined using a global positioning system (GPS) as to whether the vehicle 100 is approaching a confined space or the vehicle 100 is in a confined space. In an example, when the vehicle 100 is determined to approach a confined space, the processor 220 loads map data stored in the memory 230 to acquire the geometric information about the confined space. The acquired geometric information is, for example, a floor plan of the confined space.

In operation 320, the processor 220 determines a first beam pattern and a second beam pattern based on the geometric information. The beam may be a beam of radio waves and/or optical beam. The first beam pattern is a signal pattern of signals that are emitted first, and the second beam pattern is a signal pattern of signals that are emitted subsequently. The first beam pattern and the second beam pattern are configured to cover the confined space. For example, the first beam pattern and the second beam pattern are used to amplify a reflected or received signal of an object located at a long distance by focusing signals to the confined space.

The vehicle 100 includes one or more sensors that may include a radar and/or a LIDAR configured to emit an RF and/or optical signal to detect an object that may be based on data from the sensors and GPS data. For example, a radar example may include an antenna configured to work with a plurality of transmitters, a plurality of receivers, and/or transceivers. The transmitters emit RF signals in a first beam pattern and a second beam pattern, and the plurality of receivers receive signals reflected by objects. Examples of the first beam pattern and the second beam pattern will be further described below with reference to FIGS. 4 through 7.

In operation 330, the processor 220 detects first candidate objects based on a first transmission signal emitted to form the first beam pattern. An example of detecting first candidate objects will be further described below with reference to FIG. 8.

In operation 340, the processor 220 detects second candidate objects based on a second transmission signal emitted to form the second beam pattern. An example of detecting second candidate objects will be further described below with reference to FIG. 9.

In operation 350, the processor 220 detects a clutter object based on the first candidate objects and the second candidate objects. Clutter is unwanted echoes detected in a reflected signal. In an example, when the confined space is a tunnel, a wall of the tunnel is detected as a clutter object. In another example, when the confined space is a road with a barricade (or a guardrail) in a center lane, the barricade is detected as a clutter object. An example of detecting a clutter object will be further described below with reference to FIG. 11.

In operation 360, the processor 220 detects a target object based on the clutter object. For example, when the confined space is a tunnel, an object located in the tunnel is detected as a target object. The target object is located between both side walls of the tunnel and any detected object that is not located between the side walls of the tunnel is determined to be clutter, which may include a ghost object.

Figure 4:
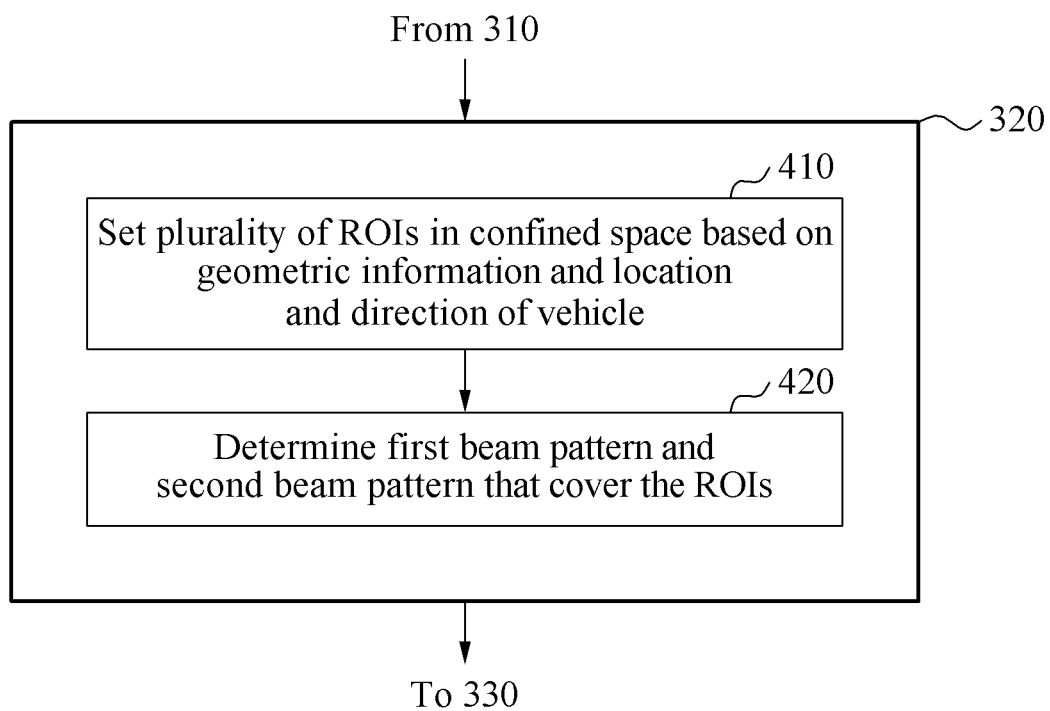
FIG. 4 is a flowchart illustrating an example of determining a first beam pattern and a second beam pattern.

FIG. 4 is a flowchart illustrating an example of determining a first beam pattern and a second beam pattern.

Referring to FIG. 4, operation 320 of FIG. 3 includes operations 410 and 420.

In operation 410, the processor 220 sets a plurality of regions of interest (ROIs) in the confined space based on the geometric information, and a direction and a location of the vehicle 100. The direction and the location of the vehicle 100 are acquired based on traveling information that may be acquired from the vehicle's GPS. The plurality of ROIs are set based on a distance from the vehicle 100. An example of a plurality of ROIs will be further described below with reference to FIG. 5.

In operation 420, the processor 220 determines the first beam pattern and the second beam pattern that cover the plurality of ROIs. The processor 220 controls a plurality of transmitters so that the first beam pattern and the second beam pattern are formed by emitted signals.

Figure 5:
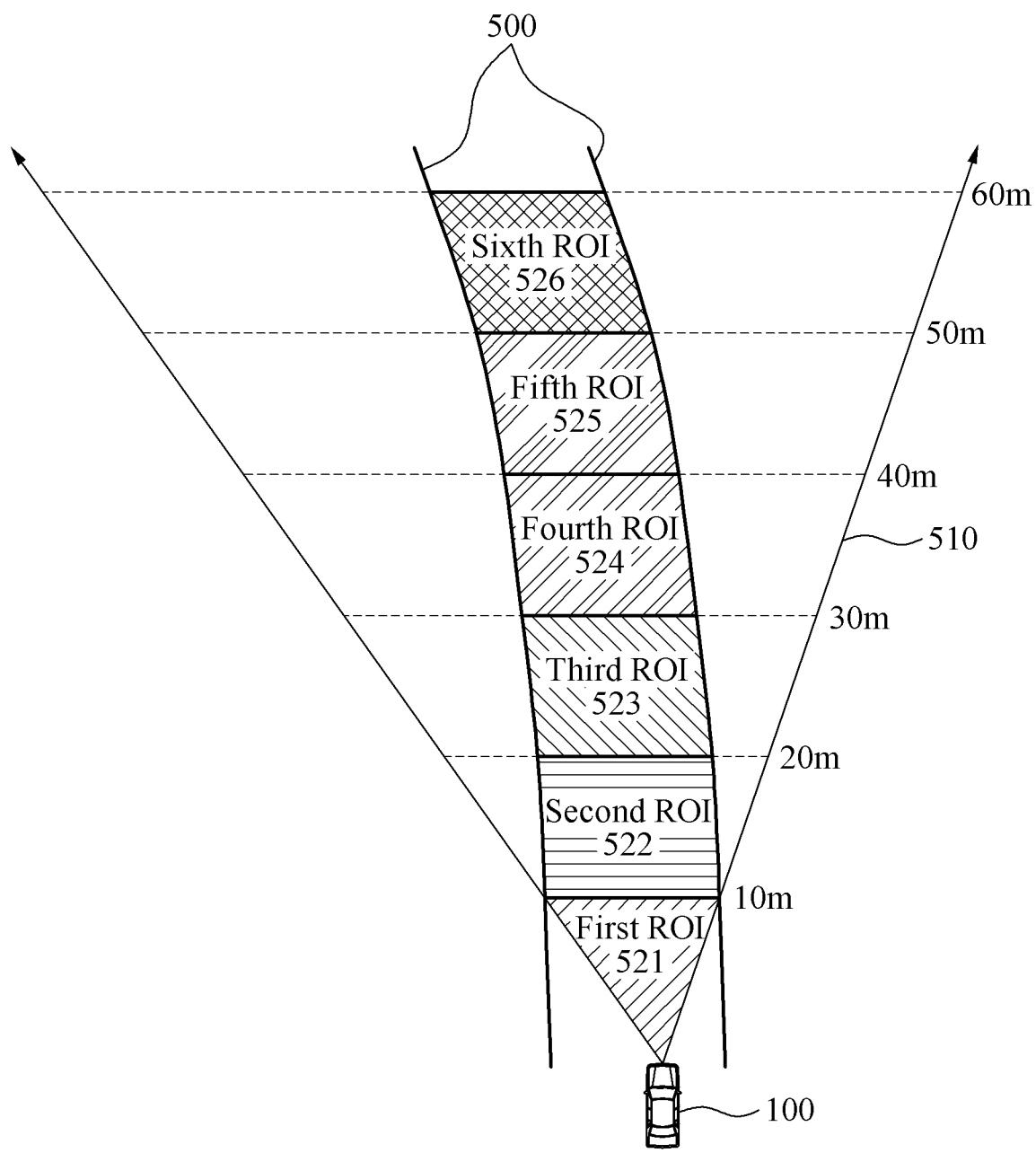
FIG. 5 illustrates an example of a plurality of regions of interest (ROIs) in a confined space.

FIG. 5 illustrates an example of a plurality of ROIs in a confined space.

Referring to FIG. 5, a plurality of ROIs, for example, a first ROI 521 through a sixth ROI 526, are set in the confined space based on geometric information about the confined space, a direction of the vehicle 100 and a location of the vehicle 100. The geometric information represents, for example, side walls 500 of a tunnel. Regions in which a FoV 510 of the vehicle 100 overlaps with a space between the walls 500 are set as the first ROI 521 through the sixth ROI 526. Each of the first ROI 521 through the sixth ROI 526 is set based on a distance from the vehicle 100.

Figure 6:
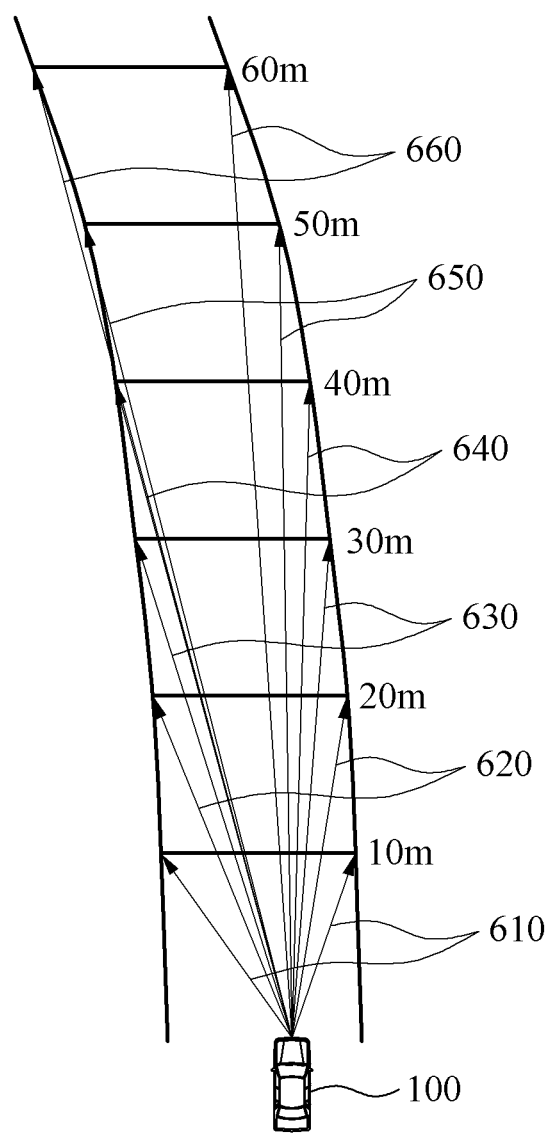
FIG. 6 illustrates an example of a field of view (FoV) for each of a plurality of ROIs.

FIG. 6 illustrates an example of a FoV for each of a plurality of ROIs.

FoVs are calculated for each of a plurality of ROIs. For example, referring to FIGS. 5 and 6, a first FoV 610 for the first ROI 521, a second FoV 620 for a second ROI 522, a third FoV 630 for a third ROI 523, a fourth FoV 640 for a fourth ROI 524, a fifth FoV 650 for a fifth ROI 525, and a sixth FoV 660 for the sixth ROI 526 are calculated.

Figure 7:
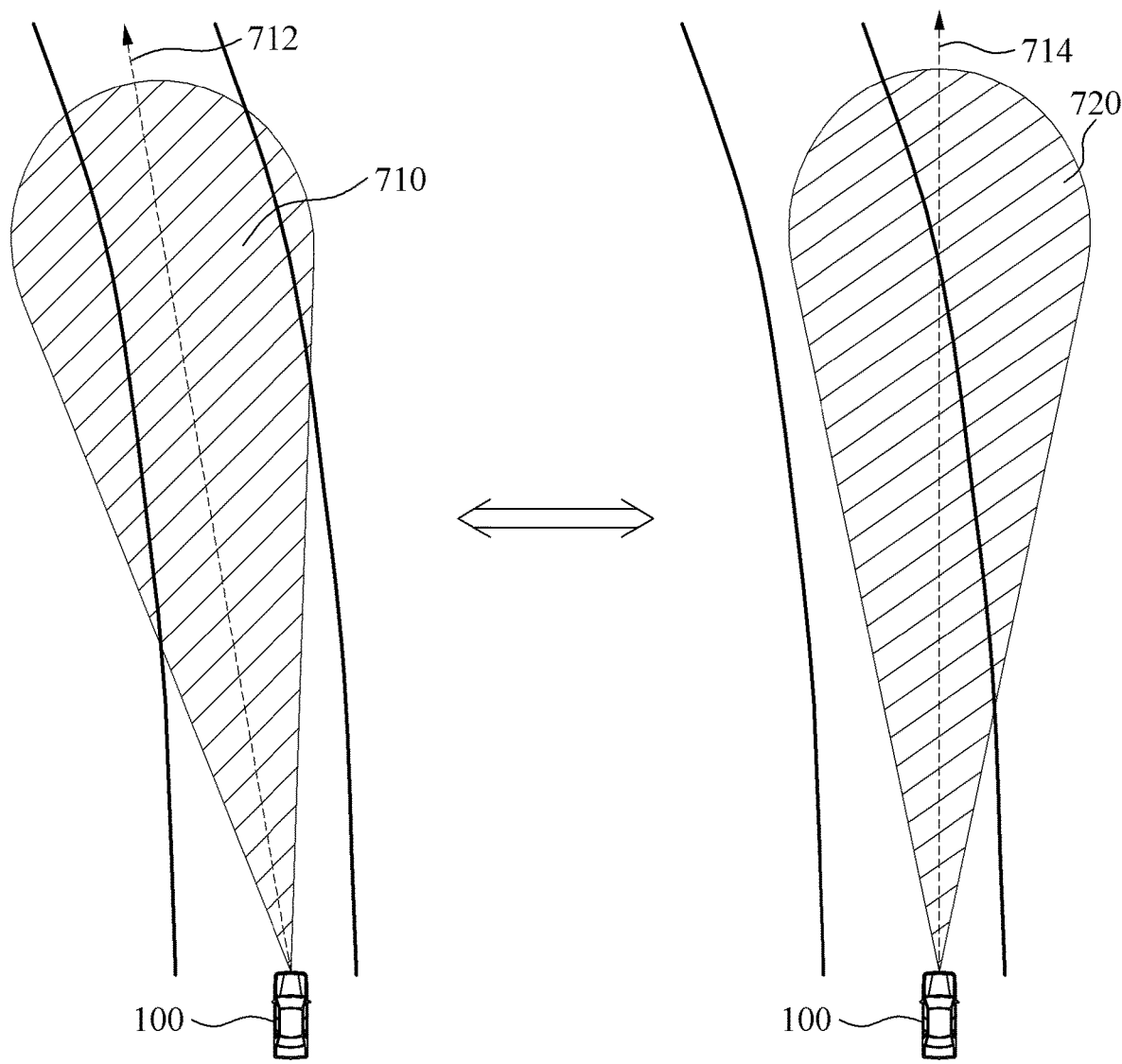
FIG. 7 illustrates an example of a first beam pattern and a second beam pattern.

FIG. 7 illustrates an example of a first beam pattern 710 and a second beam pattern 720.

The first beam pattern 710 and the second beam pattern 720 are calculated to cover the first FoV 610 through the sixth FoV 660 of FIG. 6. For example, the first beam pattern 710 is a signal pattern of signals emitted first, and a first direction 712 is a central axis of the first beam pattern 710. The second beam pattern 720 is a signal pattern of signals emitted at a subsequent time to the first beam pattern 710, and a second direction 714 is a central axis of the second beam pattern 720.

Figure 8:
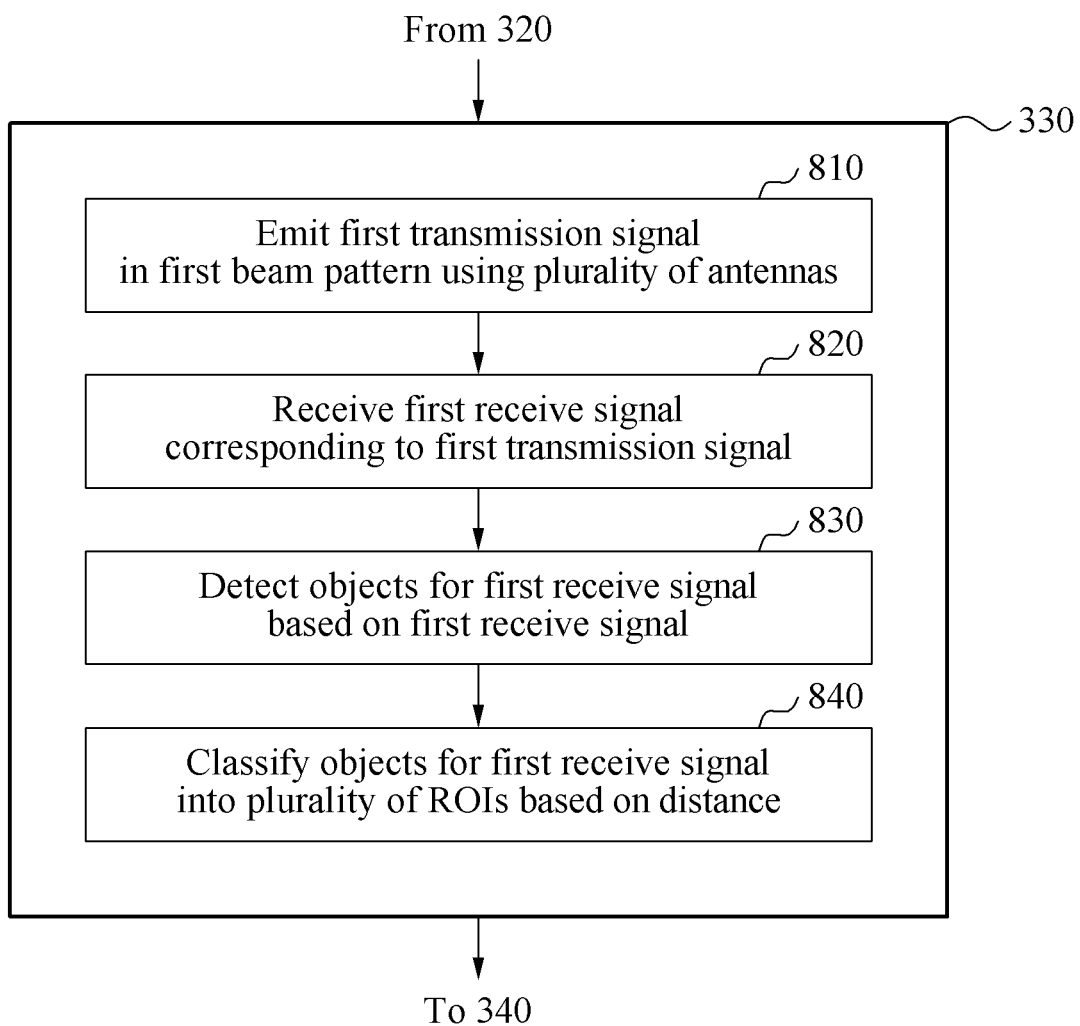
FIG. 8 is a flowchart illustrating an example of detecting objects for a first receive signal.

FIG. 8 is a flowchart illustrating an example of detecting objects for a first receive signal.

Referring to FIG. 8, operation 330 of FIG. 3 includes operations 810 through 840.

In operation 810, the processor 220 emits the first transmission signal to form the first beam pattern using a plurality of antennas. For example, the processor 220 calculates an orientation angle for corresponding transmitters for the antennas to form the first beam pattern. Each of the plurality of transmitters emits a signal at a set calculated orientation angle. Signals emitted by the plurality of transmitters may have different frequencies and/or different phases. In this example, the emitted signals are first transmission signals, and a first beam pattern is formed by the first transmission signals.

In operation 820, the processor 220 receives, through corresponding receivers for the antennas, a first receive signal corresponding to the first transmission signal. The first receive signal includes a plurality of received signals. For example, the processor 220 determines whether the first receive signal is a reflected signal for the first transmission signal, based on a phase and/or a frequency of the first receive signal.

In operation 830, the processor 220 detects objects in the first receive signal based on the first receive signal. For example, the processor 220 calculates a distance (range) to an object and a direction (angle) of the object based on the phase and/or the frequency of the first receive signal.

In operation 840, the processor 220 classifies the objects for the first receive signal into a plurality of ROIs (for example, the first ROI 521 through the sixth ROI 526 of FIG. 5) based on a distance from the vehicle.

First candidate objects are detected for each of the plurality of ROIs. For example, an object classified as the first ROI 521 is detected as a first candidate object in the first ROI 521, and an object classified as the second ROI 522 is detected as a first candidate object in the second ROI 522.

Figure 9:
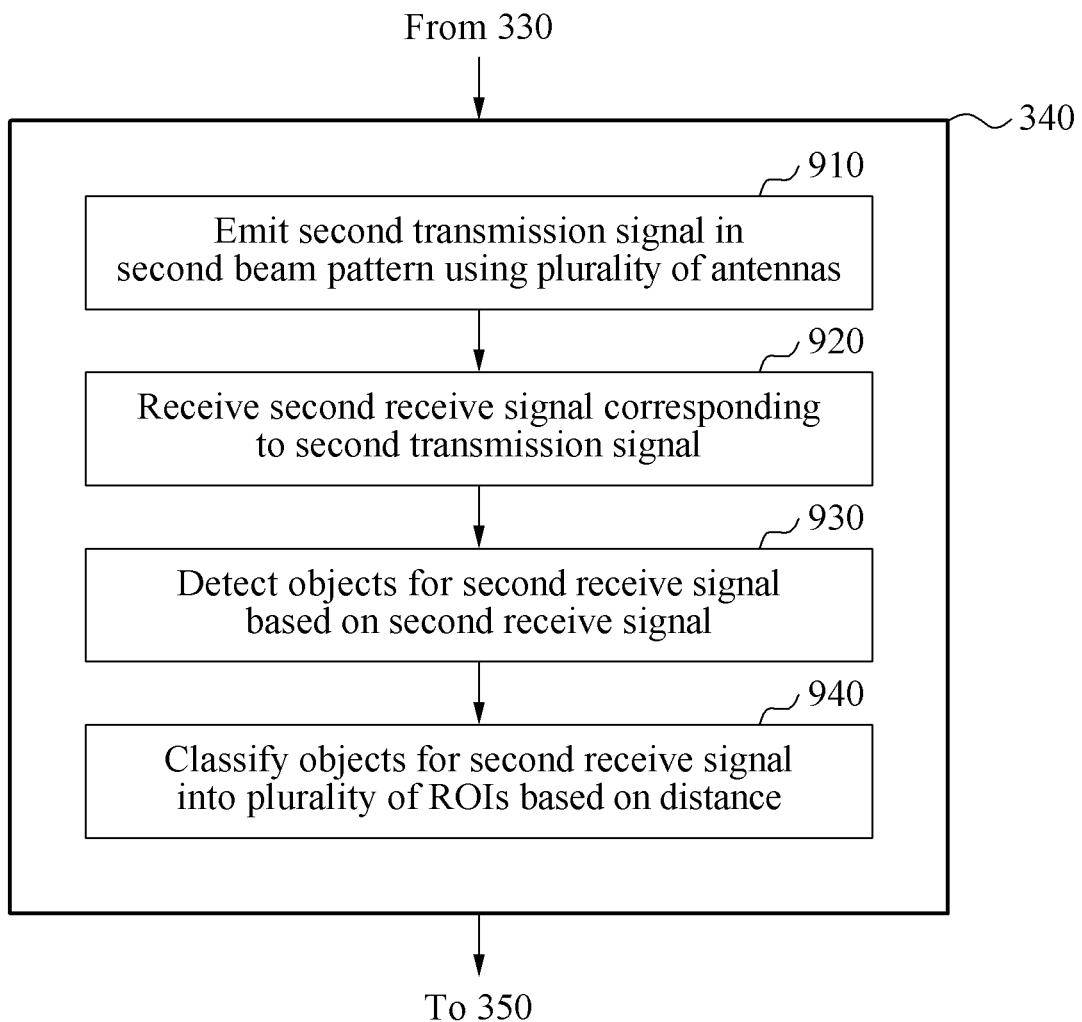
FIG. 9 is a flowchart illustrating an example of detecting objects for a second receive signal.

FIG. 9 is a flowchart illustrating an example of detecting objects for a second receive signal.

Referring to FIG. 9, operation 340 of FIG. 3 includes operations 910 through 940.

In operation 910, the processor 220 emits the second transmission signal to form the second beam pattern using a plurality of antennas. For example, the processor 220 calculates an orientation angle for corresponding transmitters for the antennas to form the second beam pattern. Each of the plurality of transmitters emits a signal at a set calculated orientation angle. Signals emitted by the plurality of transmitters may have different frequencies and/or different phases. In this example, the emitted signals are second transmission signals, and a second beam pattern is formed by the second transmission signals.

In operation 920, the processor 220 receives, through corresponding receivers for the antennas, a second receive signal corresponding to the second transmission signal. The second receive signal includes a plurality of received signals. For example, the processor 220 determines whether the second receive signal is a reflected signal for the second transmission signal, based on a phase and/or a frequency of the second receive signal.

In operation 930, the processor 220 detects objects for the second receive signal based on the second receive signal. For example, the processor 220 calculates a distance (range) to an object and a direction (angle) of the object based on the phase and/or the frequency of the second receive signal.

In operation 940, the processor 220 classifies the objects for the second receive signal into a plurality of ROIs (for example, the first ROI 521 through the sixth ROI 526 of FIG. 5) based on a distance from the vehicle.

Second candidate objects are detected for each of the plurality of ROIs. For example, an object classified as the first ROI 521 is detected as a second candidate object in the first ROI 521, and an object classified as the second ROI 522 is detected as a second candidate object in the second ROI 522.

Figure 10:
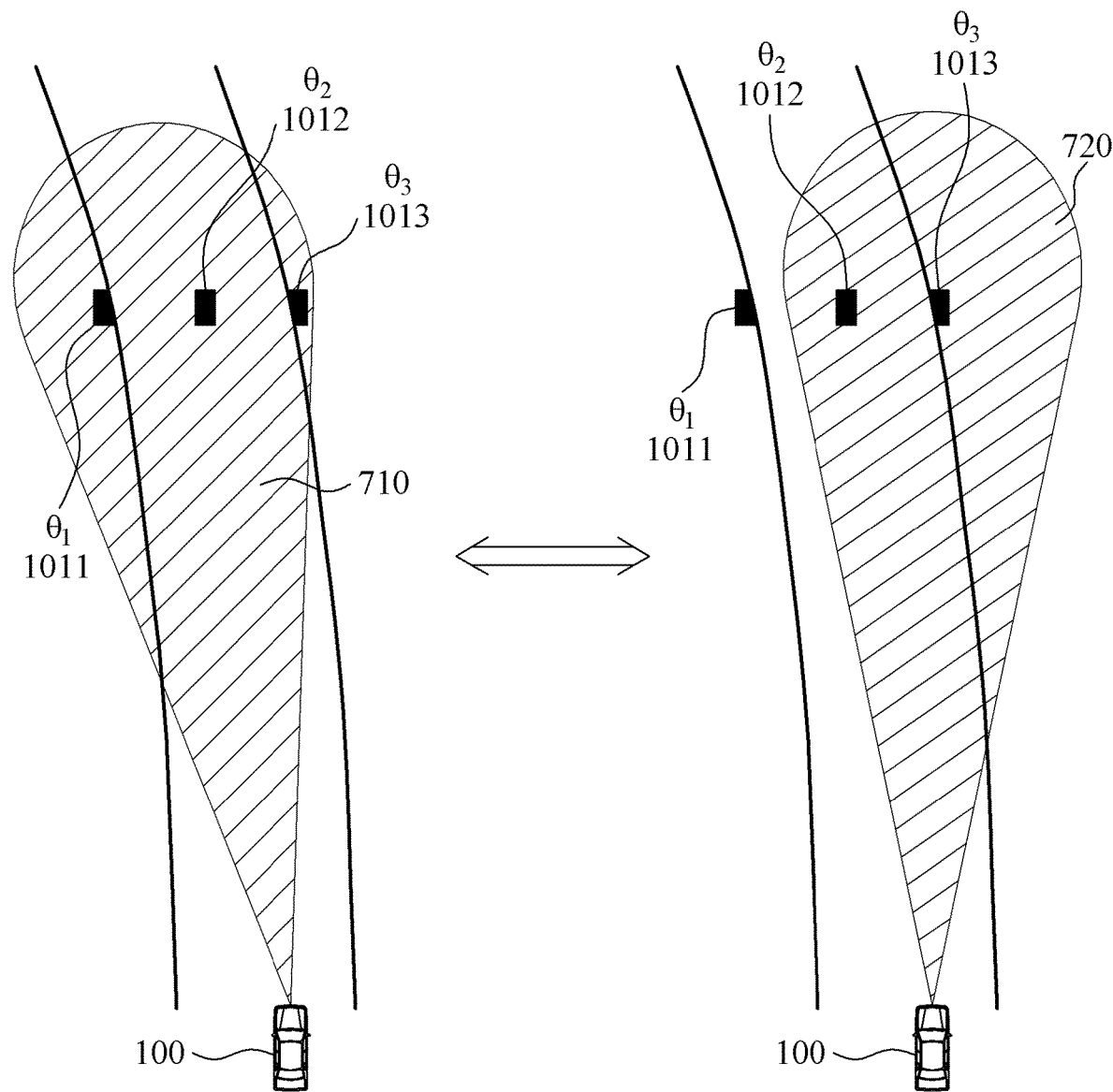
FIG. 10 illustrates an example of a detected first candidate object and a detected second candidate object.

FIG. 10 illustrates an example of a detected first candidate object and a detected second candidate object.

Referring to a left portion of FIG. 10, objects 1011, 1012 and 1013 are detected based on a first transmission signal emitted to form the first beam pattern 710. The objects 1011 through 1013 are detected based on an orientation angle at which each of a plurality of transmitters emits a signal of the first transmission signal, an angle at which each of a plurality of receivers receives a signal of the first transmission signal, and an intensity of the received first transmission signal. The objects 1011 through 1013 are located at angles θ1, θ2 and θ3, with respect to a front side of the vehicle 100, respectively.

A first radar cross-section (RCS) of each of the detected objects 1011 through 1013 is calculated based on a signal received by each of the plurality of receivers. The objects 1011 through 1013 are classified as the same ROI and are included as first candidate objects in the ROI (classified as first candidate objects in the same ROI). The objects 1011 through 1013 are classified as a predetermined ROI as shown in FIG. 10, however, there is no limitation thereto. For example, objects for each of a plurality of ROIs may be simultaneously classified.

After the first transmission signal is emitted to form the first beam pattern 710, a second transmission signal is emitted to form the second beam pattern 720. Referring to a right portion of FIG. 10, objects 1011, 1012 and 1013 are detected based on the second transmission signal emitted to form the second beam pattern 720. The objects 1011 through 1013 are detected based on an orientation angle at which each of a plurality of transmitters emits a signal of the second transmission signal, an angle at which each of a plurality of receivers receives a signal of the emitted second transmission signal, and an intensity of the received second transmission signal. A second RCS of each of the objects 1011 through 1013 is calculated. The objects 1011 through 1013 are classified as the same ROI and are included as second candidate objects in the ROI (classified as second candidate objects in the same ROI). For example, when an object classified as a predetermined ROI by the first beam pattern 710 and an object classified as a predetermined ROI by the second beam pattern 720 are located within a preset distance range and a preset angle range, the objects are recognized as the same object.

A clutter object and a target object for a predetermined ROI are detected based on the first RCS and the second RCS. An example of detecting a clutter object and a target object based on a first RCS and a second RCS will be further described below with reference to FIG. 11.

Figure 11:
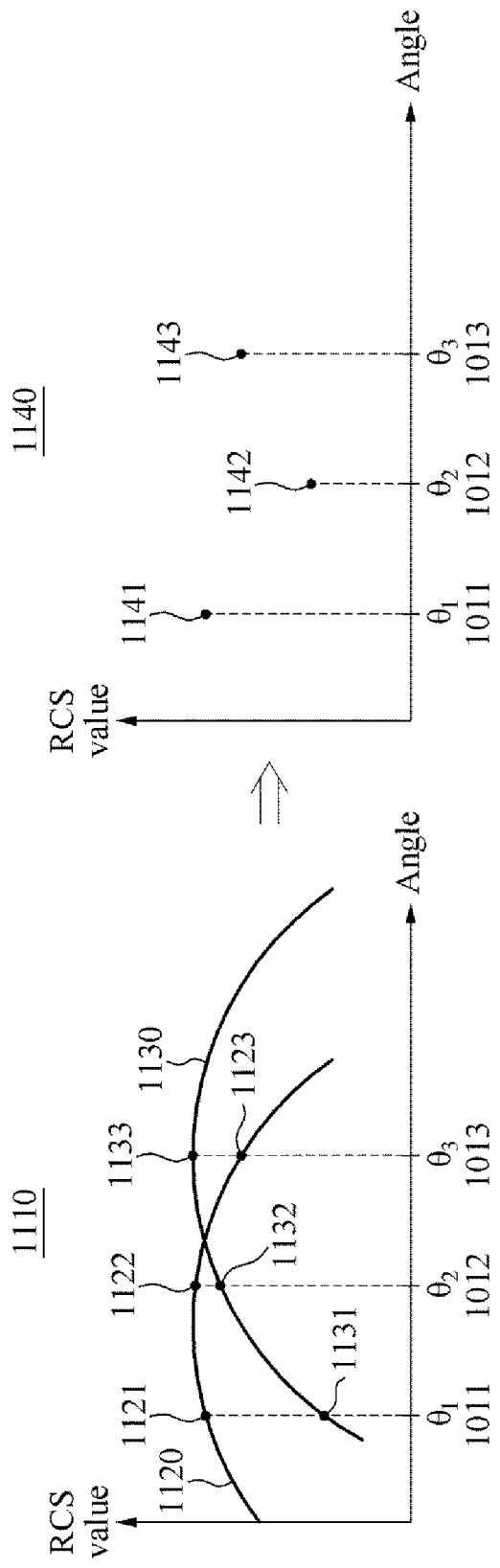
FIG. 11 illustrates an example of a radar cross-section (RCS) value of a first candidate object, an RCS value of a second candidate object and a difference between RCS values.

FIG. 11 illustrates an example of an RCS value of a first candidate object, an RCS value of a second candidate object, and a difference between RCS values.

A left graph 1110 of FIG. 11 illustrates a first RCS trajectory 1120 and a second RCS trajectory 1130. The first RCS trajectory 1120 represents RCS values of first candidate objects, and the second RCS trajectory 1130 represents RCS values of second candidate objects. A right graph 1140 of FIG. 11 illustrates differences between the RCS values of the first candidate objects and the RCS values of the second candidate objects.

Referring to FIGS. 7 and 10, in an example in which the first transmission signal is emitted to form the first beam pattern 710, when an object is located closer to the first direction 712 that is the central axis of the first beam pattern 710, an RCS value reflected by the object increases. RCS is a measure of a target's ability to reflect radar signals in the direction of the radar receiver. In this example, when the object is located further away from the first direction 712, the RCS value decreases. The first RCS trajectory 1120 is calculated for a predetermined ROI based on a first receive signal. Due to the object 1012 being closer to the first direction 712 than the objects 1011 and 1013, an RCS value 1122 of the object 1012 is greater than an RCS value 1121 of the object 1011 and an RCS value 1123 of the object 1013. An object with an RCS value calculated to differ from the first RCS trajectory 1120 by at least a preset ratio among objects classified as a predetermined ROI is highly likely to be a ghost object, and accordingly is excluded from first candidate objects.

Similarly to the first RCS trajectory 1120, the second RCS trajectory 1130 is calculated for a predetermined ROI based on a second receive signal. Referring to FIGS. 7 and 10, because the object 1013 is closer to the second direction 714 than the objects 1011 and 1012, an RCS value 1133 of the object 1013 is greater than an RCS value 1131 of the object 1011 and an RCS value 1132 of the object 1012. An object with an RCS value calculated to differ from the second RCS trajectory 1130 by at least a preset ratio among objects classified as a predetermined ROI is highly likely to be a ghost object, and accordingly is excluded from second candidate objects.

Differences 1141, 1142 and 1143 between the RCS values are calculated based on the first RCS trajectory 1120 and the second RCS trajectory 1130. When the objects 1011 through 1013 are not ghost objects, the differences 1141 through 1143 fall within a range of calculated RCS differences. For example, because the object 1011 is located at the angle Ai with respect to a front side of the vehicle 100, a first predicted RCS value for the first beam pattern 710 and a second predicted RCS value for the second beam pattern 720 are calculated in advance, and a difference between the first predicted RCS value and the second predicted RCS value is calculated in advance. When an actual RCS difference for the object 1011 is calculated to be within a range of predicted RCS differences, the object 1011 is determined to be a real object.

A clutter object, detected among the objects 1011 through 1013, is determined to be a real object based on the geometric information of the confined space. In an example, when the confined space is a tunnel, the objects 1011 and 1013 located at outermost positions with respect to a front side of the vehicle 100 are determined as clutter objects. In another example, when the confined space is a road with a barricade in a center lane, the object 1011 is determined as a clutter object.

A target object among the objects 1011 through 1013 is determined to be a real object based on the clutter object. For example, when two clutter objects exist, an object between the two clutter objects may be determined to be a target object. In an example, when the confined space is a tunnel, the object 1012 located between the objects 1011 and 1013 determined as clutter objects is determined to be a target object. In another example, when the confined space is a road with a barricade in a center lane, the objects 1012 and 1013, excluding the object 1011 determined as a clutter object, are determined as target objects.

Figure 12:
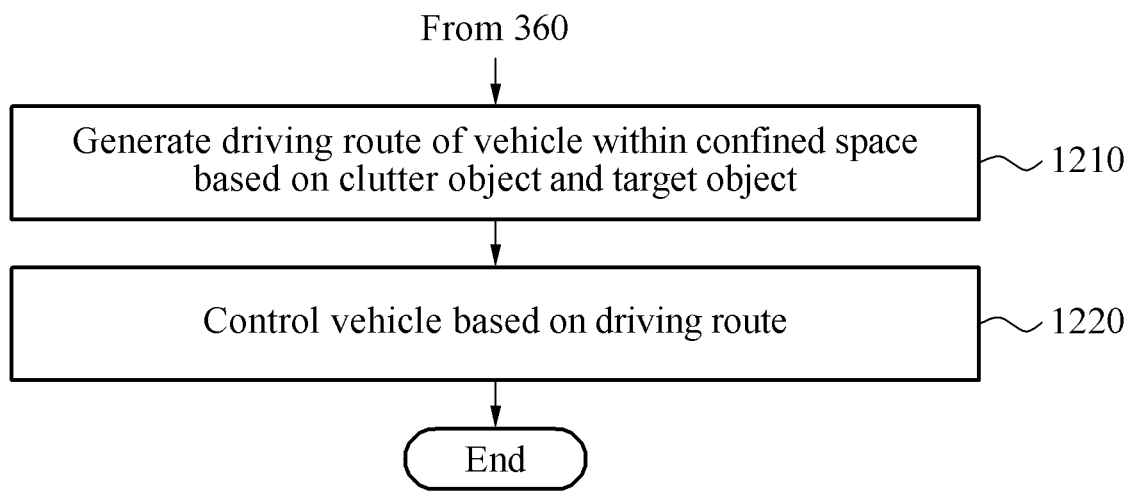
FIG. 12 is a flowchart illustrating an example of controlling a vehicle based on a driving route.

FIG. 12 is a flowchart illustrating an example of controlling a vehicle based on a driving route.

Operations 1210 and 1220 of FIG. 12 are performed after operation 360 of FIG. 3 is performed. Operations 1210 and 1220 are performed by, for example, the object detection apparatus 200 described above with reference to FIGS. 2 through 11.

In operation 1210, the processor 220 generates a driving route for the vehicle 100 within the confined space based on detected clutter and target objects. For example, when the confined space is a tunnel, the vehicle 100 travels between side walls of the tunnel and the driving route is generated to avoid the target object.

In operation 1220, the processor 220 controls the vehicle 100 based on the driving route. For example, driving devices of the vehicle 100 are controlled so that the vehicle 100 travels along the driving route.

Figure 13:
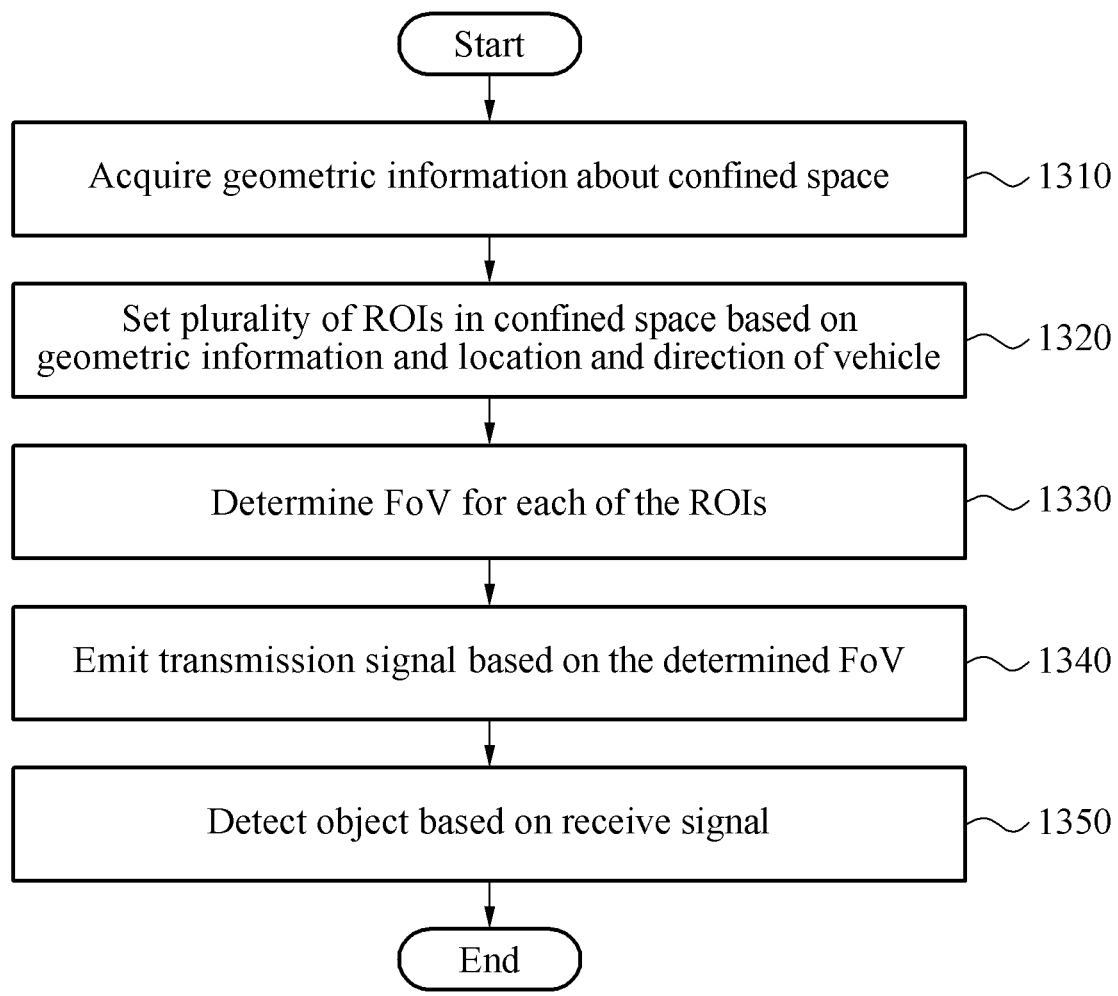
FIG. 13 is a flowchart illustrating an example of an object detection method.

FIG. 13 is a flowchart illustrating another example of an object detection method.

Operations 1310 through 1350 of FIG. 13 are performed by, for example, the object detection apparatus 200 described above with reference to FIGS. 2 through 12.

In operation 1310, the processor 220 acquires the geometric information for a confined space. For example, a location of the vehicle 100 is determined using a GPS. Based on the determined location, whether the vehicle 100 approaches the confined space or whether the vehicle 100 is located in the confined space is determined. For example, when the vehicle 100 is determined to approach the confined space, the processor 220 loads map data stored in the memory 230, to acquire the geometric information for the confined space. The acquired geometric information is, for example, a floor plan of the confined space.

In operation 1320, the processor 220 sets a plurality of ROIs in the confined space based on the geometric information, and a direction and the location of the vehicle 100. The above description of FIGS. 4 and 5 is similarly applicable to an example of setting a plurality of ROIs, and thus is not repeated here.

In operation 1330, the processor 220 determines a FoV for each of the plurality of ROIs. The above description of FIG. 6 is similarly applicable to an example of determining a FoV for each of a plurality of ROIs, and thus is not repeated here.

In operation 1340, the processor 220 emits a transmission signal to detect an object based on the determined FoV. For example, the processor 220 calculates an orientation angle of each of a plurality of antennas to emit a transmission signal within the determined FoV, and emits the transmission signal at the calculated orientation angle. A pattern of the transmission signal emitted by the transmitters at the calculated orientation angle is referred to as a "beam pattern." When an object is located in a propagation path of the transmission signal, the transmission signal is reflected from the object and returns to the object detection apparatus 200. Reflected signals are received by the receivers configured for the antennas.

In operation 1350, the processor 220 detects an object based on a receive signal. For example, the processor 220 calculates a distance from the object based on a difference between a time at which the transmission signal is emitted and a time at which the receive signal is received, and calculates an angle of the object based on an angle at which the receive signal is received and an intensity of the receive signal. Objects are detected for each of a plurality of ROIs. A process of detecting an object is performed in parallel for each of the plurality of ROIs.

The object detection apparatuses described herein and the operations illustrated in FIGS. 1-13 improve the accuracy of the determination of a vehicle's path in a confined space.

The object detection apparatus 200, the communicator 210, the processor 220 and the memory 230 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented object detection method for a vehicle traveling in a confined space, comprising:
    determining a first beam pattern and a second beam pattern based on geometric information of the confined space;
    detecting first candidate objects based on a first transmission signal emitted to form the first beam pattern using at least one antenna;
    detecting second candidate objects based on a second transmission signal emitted to form the second beam pattern using the at least one antenna;
    detecting at least one clutter object based on the first candidate objects and the second candidate objects;
    detecting a ghost object based on the at least one clutter object; and
    controlling an operation of the vehicle based on a result of the detecting of the ghost object.

2. The method of claim 1, wherein
    the detecting of the first candidate objects comprises:
    emitting the first transmission signal to form the first beam pattern using the at least one antenna;
    receiving a first receive signal corresponding to the first transmission signal;
    detecting objects for the first receive signal based on the first receive signal; and
    classifying the objects for the first receive signal into a plurality of preset regions of interest (ROIs) based on a distance from the vehicle, the plurality of ROI comprising a target region, and the first candidate objects being included in the target region.

3. The method of claim 2, wherein
the detecting of the second candidate objects comprises:
emitting the second transmission signal to form the second beam pattern using the at least one antenna;
receiving a second receive signal corresponding to the second transmission signal;
detecting objects for the second receive signal based on the second receive signal; and
classifying the objects for the second receive signal into the plurality of ROIs based on the distance from the vehicle, and the target region comprising the second candidate objects.

4. The method of claim 3, wherein the detecting of the at least one clutter object comprises detecting the at least one clutter object based on a radar cross-section (RCS) of each of the first candidate objects and an RCS of each of the second candidate objects.

5. The method of claim 1, further comprising:
detecting a target object based on the at least one clutter objects; and
controlling an operation of the vehicle based on a result of the detecting of the target object,
wherein the detecting of the target object comprises, in response to two clutter objects being detected, detecting an object located between the two clutter objects as the target object.

6. The method of claim 1, wherein the determining of the first beam pattern and the second beam pattern comprises:
setting a plurality of ROIs in the confined space based on the geometric information and a location of the vehicle; and
determining the first beam pattern and the second beam pattern that cover the plurality of ROIs.

7. The method of claim 1, further comprising:
acquiring the geometric information based on a location of the vehicle.

8. The method of claim 1, further comprising:
generating a driving route for the vehicle within the confined space based on the at least one clutter object and the target object; and
controlling the vehicle based on the driving route.

9. The method of claim 1, wherein the processor is included in the vehicle.

10. A non-transitory computer-readable storage medium storing instructions that, when executed by a processor, cause the processor to perform the method of claim 1.

11. An object detection apparatus included in a vehicle traveling in a confined space, comprising:
a processor configured to:
determine a first beam pattern and a second beam pattern based on geometric information about the confined space;
detect first candidate objects based on a first transmission signal emitted to form the first beam pattern using at least one antenna;
detect second candidate objects based on a second transmission signal emitted to form the second beam pattern using the at least one antenna;
detect at least one clutter object based on the first candidate objects and the second candidate objects;
detect a ghost object based on the at least one clutter object; and
control an operation of the vehicle based on a result of the detection of the ghost object.

12. The object detection apparatus of claim 11, further comprising a memory configured to store instructions, wherein the processor is further configured to execute the instructions to configure the processor to:
determine the first beam pattern and the second beam pattern based on geometric information about the confined space;
detect the first candidate objects based on the first transmission signal emitted to form the first beam pattern using the at least one antenna;
detect the second candidate objects based on the second transmission signal emitted to form the second beam pattern using the at least one antenna;
detect the at least one clutter object based on the first candidate objects and the second candidate objects; and
detect the target object based on the at least one clutter object.

13. The object detection apparatus of claim 11, wherein to perform the detecting of the first candidate objects, the processor is configured to:
emit the first transmission signal to form the first beam pattern using the at least one antenna;
receive a first receive signal corresponding to the first transmission signal;
detect objects for the first receive signal based on the first receive signal; and
classify the objects for the first receive signal into a plurality of preset regions of interest (ROIs) based on a distance from the vehicle, the plurality of ROIs comprising a target region, and the first candidate objects being included in the target region.

14. The object detection apparatus of claim 13, wherein to perform the detecting of the second candidate objects, the processor is configured to:
emit the second transmission signal to form the second beam pattern using the at least one antenna;
receive a second receive signal corresponding to the second transmission signal;
detect objects for the second receive signal based on the second receive signal; and
classify the objects for the second receive signal into the plurality of ROIs based on the distance from the vehicle, and the target region comprising the second candidate objects.

15. The object detection apparatus of claim 14, wherein to perform the detecting of the at least one clutter object, the processor is configured to detect the at least one clutter object based on a radar cross-section (RCS) of each of the first candidate objects and an RCS of each of the second candidate objects.

16. The object detection apparatus of claim 11, wherein the program is further executed to:
detect a target object based on the at least one clutter objects; and
control an operation of the vehicle based on a result of the detecting of the target object,
wherein to perform the detecting of the target object, the processor is configured to, in response to two clutter objects being detected, detect an object located between the two clutter objects as the target object.

17. The object detection apparatus of claim 11, wherein to perform the determining of the first beam pattern and the second beam pattern, the processor is configured to:
set a plurality of ROIs in the confined space based on the geometric information and a location of the vehicle; and
determine the first beam pattern and the second beam pattern that cover the plurality of ROIs.

18. The object detection apparatus of claim 11, wherein the program is further executed to acquire the geometric information based on a location of the vehicle.

19. The object detection apparatus of claim 11, wherein the program is further executed to:
   generate a driving route for the vehicle within the confined space based on the at least one clutter object and the target object; and
   control the vehicle based on the driving route.

20. The object detection apparatus of claim 11, wherein the confined space comprises at least one of a tunnel and a road with a barricade.

* * * * *